United States Patent
Mazzagatte et al.

(10) Patent No.: US 10,944,747 B2
(45) Date of Patent: Mar. 9, 2021

(54) DEVICES, SYSTEMS, AND METHODS FOR ZERO-TRUST SINGLE SIGN-ON

(71) Applicants: Canon Information and Imaging Solutions, Inc., Melville, NY (US); Canon U.S.A., Inc., Melville, NY (US)

(72) Inventors: Craig Mazzagatte, Aliso Viejo, CA (US); Allison Bajo, Carson, CA (US); Hari Rathod, Misson Viejo, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 676 days.

(21) Appl. No.: 15/603,980

(22) Filed: May 24, 2017

(65) Prior Publication Data

US 2017/0346810 A1    Nov. 30, 2017

Related U.S. Application Data

(60) Provisional application No. 62/341,432, filed on May 25, 2016.

(51) Int. Cl.
*H04L 29/06* (2006.01)
*H04L 12/24* (2006.01)

(52) U.S. Cl.
CPC .............. *H04L 63/10* (2013.01); *H04L 41/28* (2013.01)

(58) Field of Classification Search
CPC ..... H04L 63/10; H04L 63/104; H04L 63/105; H04L 41/28
See application file for complete search history.

(56) References Cited

U.S. PATENT DOCUMENTS

| | | | |
|---|---|---|---|
| 8,201,217 B1 | 6/2012 | Begen | |
| 8,474,017 B2* | 6/2013 | Schultz | G06F 21/41 726/4 |
| 8,875,166 B2 | 10/2014 | Plewnia | |
| 9,325,632 B2 | 4/2016 | Banatwala | |
| 9,401,918 B2* | 7/2016 | Lu | G06F 21/6218 |
| 9,515,950 B2 | 12/2016 | Banatwala | |
| 9,537,857 B1* | 1/2017 | Koved | H04L 63/083 |
| 10,284,366 B2* | 5/2019 | Striem-Amit | A63G 31/16 |
| 2008/0059804 A1* | 3/2008 | Shah | G06F 21/41 713/186 |
| 2013/0145006 A1* | 6/2013 | Tammam | G06F 9/5027 709/223 |

(Continued)

OTHER PUBLICATIONS

ForgeRock, ForgeRock Releases Breakthrough Identity Bridge for Cloud Service Providers, Jul. 30, 2013.

*Primary Examiner* — Saleh Najjar
*Assistant Examiner* — Devin E Almeida
(74) *Attorney, Agent, or Firm* — Canon U.S.A., Inc. IP Division

(57) ABSTRACT

Devices, systems, and methods receive a token and a request to create a joint tenant, wherein at least one of the token and the request identifies a first user of a first tenant of a first service; receive one or more administrator credentials for a second service; send the one or more administrator credentials and a request to create a service account to the second service; and create a joint tenant that includes a tenant of the first service and a tenant of the second service, wherein the first user is included in the tenant of the first service, and wherein the service account is included in the tenant of the second service.

20 Claims, 8 Drawing Sheets

(56) References Cited

U.S. PATENT DOCUMENTS

| | | | |
|---|---|---|---|
| 2014/0013409 A1* | 1/2014 | Halageri | H04L 63/0815 |
| | | | 726/8 |
| 2014/0090037 A1* | 3/2014 | Singh | G06F 21/335 |
| | | | 726/7 |
| 2014/0280939 A1* | 9/2014 | Banatwala | H04L 47/70 |
| | | | 709/225 |
| 2015/0007263 A1 | 1/2015 | Stewart | |
| 2016/0132214 A1* | 5/2016 | Koushik | H04L 63/10 |
| | | | 715/741 |
| 2017/0339148 A1* | 11/2017 | Syomichev | G06F 21/6245 |

* cited by examiner

ABOUT US 10,944,747 B2

DEVICES, SYSTEMS, AND METHODS FOR ZERO-TRUST SINGLE SIGN-ON

CROSS-REFERENCE TO RELATED APPLICATIONS

This application claims the benefit of U.S. application Ser. No. 62/341,432, which was filed on May 25, 2016.

BACKGROUND

Technical Field

This application generally relates to authentication and authorization in computer systems.

Background

Some computer service providers use sign-on-based authentication techniques to control access to resources. These techniques may include single sign-on, which allows a user to access multiple applications with the same credentials.

SUMMARY

Some embodiments of a device comprise one or more computer-readable storage media, and one or more processors that are coupled to the one or more computer-readable storage media. The one or more processors are configured to cause the device to receive a token and a request to create a joint tenant, wherein at least one of the token and the request identifies a first user of a first tenant of a first service; receive one or more administrator credentials for a second service; send the one or more administrator credentials and a request to create a service account to the second service; and create a joint tenant that includes a tenant of the first service and a tenant of the second service, wherein the first user is included in the tenant of the first service, and wherein the service account is included in the tenant of the second service.

Some embodiments of a method comprise receiving a token and a request to create a joint tenant; receiving user information that identifies a first user of a first tenant of a first service that is provided by one or more first-service devices; receiving one or more administrator credentials for a second service that is provided by one or more second-service devices; sending the one or more administrator credentials and a request to create a service account to the second service; and creating a joint tenant that includes a tenant of the first service and a tenant of the second service, wherein the tenant of the first service includes the first user, and wherein the tenant of the second service includes the service account.

Some embodiments of one or more computer-readable storage media store instructions that, when executed by one or more computing devices, cause the one or more computing devices to perform operations that comprise receiving, from a user device, a token and a request to create a joint tenant; receiving, from the user device, user information that identifies a first user of a first tenant of a first service that is provided by one or more first-service devices; receiving, from the user device, one or more administrator credentials for a second service that is provided by one or more second-service devices; sending the one or more administrator credentials and a request to create a service account to the second service; and creating a joint tenant that includes a tenant of the first service and a tenant of the second service, wherein the tenant of the first service includes the first user, and wherein the tenant of the second service includes the service account.

BRIEF DESCRIPTION OF THE DRAWINGS

FIG. 1 illustrates an example embodiment of a system for zero-trust single sign-on.

FIG. 2 illustrates the flow of information in an example embodiment of a system for zero-trust single sign-on.

FIG. 4 illustrates an example embodiment of a system for zero-trust single sign-on.

FIG. 8 illustrates an example embodiment of a system for zero-trust single sign-on.

DESCRIPTION

The following paragraphs describe explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
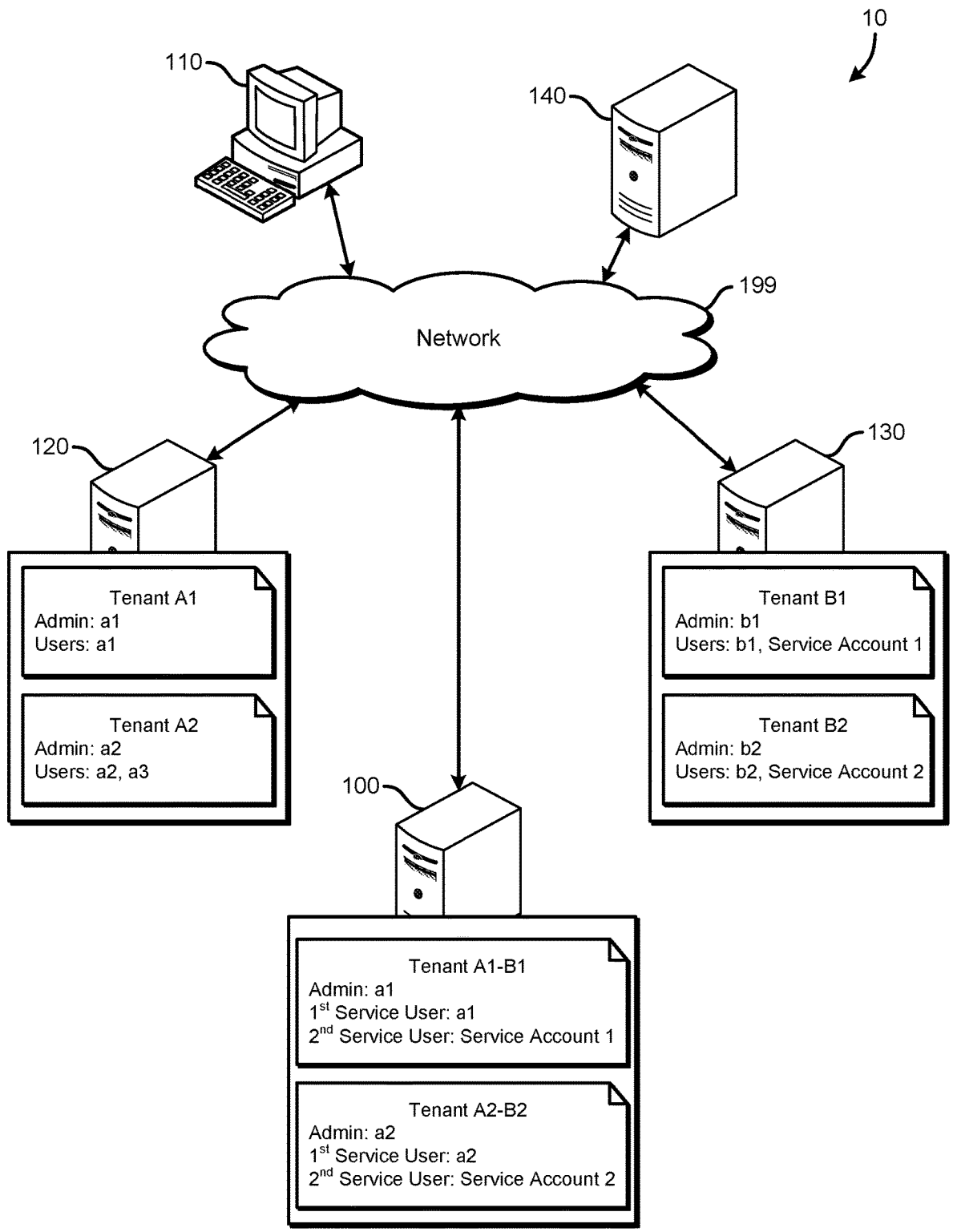

FIG. 1 illustrates an example embodiment of a system for zero-trust single sign-on. The system 10 includes one or more single-sign-on bridge devices 100 (SSO bridges 100), which are specially-configured computing devices; a user device 110; a first-service device 120, which provides a first service; a second-service device 130, which provides a second service; and a key store 140. In some embodiments, the key store 140 is implemented by one or more of the SSO bridges 100. Also, in this embodiment, the devices communicate by means of a network 199, which may include a wired network, a wireless network, a LAN, a WAN, a MAN, and a PAN. In some embodiments the devices communicate by means of other wired or wireless channels.

The first service, which is provided by the first-service device 120, and the second service, which is provided by the second-service device 130, are separate services with separate tenancies and user accounts. The SSO bridges 100 bring separate tenants (e.g., a tenant of the first service and a tenant of the second service) together into a single joint tenant, even if the first service and the second service do not have a relationship of trust. Thus, even if the first service and the second service do not have a relationship of trust, the joint tenant can be setup, for example with a "service account," to allow a user to access the services provided by the second-service device 130 after the user is authenticated and authorized by the first-service device 120, thereby emulating the effect of a single-sign on. To accomplish this, the SSO bridges 100 may create a new joint tenant that includes identifiers from both the first service and the second service. Accordingly, the SSO bridges 100 enable a single-sign-on experience for a user who uses both the first service, which is provided by the first-service device 120, and the second service, which is provided by the second-service device 130, although the user's identity at each service and the authentication mechanisms of each service may be entirely separate.

For example, in FIG. 1, the first service has two tenants: tenant A1 and tenant A2. Tenant A1 has one administrator, a1, who is also the only user. Tenant a2 has one administrator, a2, and two users, a2 and a3. The second service also has two tenants: tenant B1 and tenant B2. Tenant B1 has one administrator, b1, and has two users, b1 and service account 1. Tenant B2 has one administrator, b2, and has two users, b2 and service account 2.

The SSO bridges 100 implement two joint tenants: tenant A1-B1 and tenant A2-B2. Tenant A1-B1 and tenant A2-B2 each includes two users: one for the first service and one for the second service. For example, for tenant A1-B1, a1 is the user of the first service, and service account 1 is the user of the second service. Thus, each of the joint tenants of the SSO bridges 100 can use both the first service and the second service.

Figure 2:
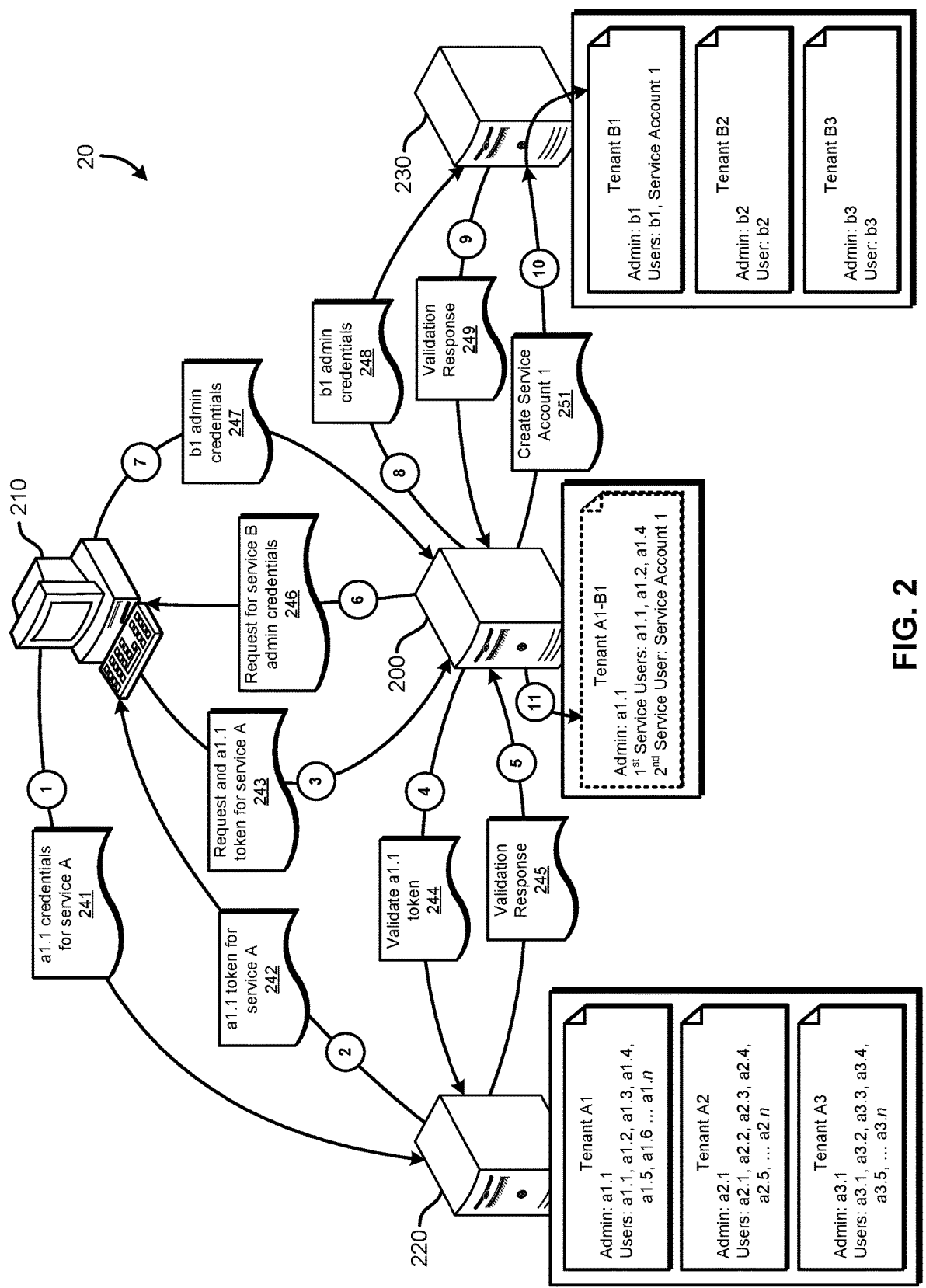

FIG. 2 illustrates the flow of information in an example embodiment of a system 20 for zero-trust single sign-on. Although the flow of information is presented in a certain order, some embodiments of the system 20 perform at least some of the stages in different orders than the presented orders. The flow of information shows the creation of a joint tenant in an SSO bridge 200. Also, in this example the first service is service A, and the second service is service B. In stage 1, a user device 210 sends user a1.1's credentials for service A (241) to the first-service device 220. The first-service device 220 authenticates user a1.1 and sends a token for user a1.1 for service A (242) to the user device 210 in stage 2.

Next, in stage 3, the user device 210 sends a request with the token for a1.1 for service A (243) to the SSO bridge 200. Then in stage 4 the SSO bridge 200 sends a validation request and the token for a1.1 for service A (244) to the first-service device 220. The first-service device 220 validates the token and then sends a validation response (245) back to the SSO bridge 200 in stage 5. The validation response (245) also identifies user a1.1; the tenant that a1.1 belongs to, which is tenant A1; and any other users of tenant A1 that should be added to a new joint tenant. In this example, these other users are a1.2 and a1.4.

If the token is valid, then in stage 6 the SSO bridge 200 sends a request for administrator credentials for service B (246) to the user device 210. The user device 210 obtains the administrator credentials of b1, who is an administrator of tenant B1 at the second service. For example, the user device 210 may prompt a user to input the administrator credentials, and in response the user may enter the administrator credentials of b1. Next, in stage 7, the user device 210 sends the administrator credentials of b1 for service B (247) to the SSO bridge 200. Following, in stage 8, the SSO bridge 200 then sends a validation request and the administrator credentials of b1 for service B (248) to the second-service device 230. In stage 9, the second-service device 230 validates the administrator credentials of b1 and sends a validation response (249) to the SSO bridge 200. In response to the validation, in stage 10 the SSO bridge 230 uses the administrator credentials of b1 to request that the second-service device 230 create service account 1 (251) as a new user of tenant B1.

Finally, in stage 11 the SSO bridge 200 creates joint tenant A1-B1. In this embodiment, the administrator of tenant A1-B1 is a1.1. Also, the users of the first service (service A) in tenant A1-B1 207 are a1.1, a1.2, and a1.4. The user of the second service (service B) is service account 1. Thus, in tenant A1-B1, multiple users of service A use the same user account of service B to access the services of service B.

Therefore, the first-service device 220 and the second-service device 230 do not need to be aware of each other and do not need to directly communicate. The SSO bridge 200 manages the joint tenant. Also, the administrator of a joint tenant can have complete control over who can access the second service by means of the joint tenant.

Additionally, credentials of the users of tenants of the first service and credentials of users of tenants of the second service are not stored in the SSO bridge 200 or in a key store. Although in some embodiments the SSO bridge 200 creates a service account, which may have a username and a password, the username and password can be entirely managed by the SSO bridge 200 and never need to be exposed to a user or an administrator. For example, the SSO bridge 200 can automatically renew or change the password.

Thus, the SSO bridge 200 provides a bridge between two services that cannot communicate with each other. And a joint tenancy of the SSO bridge 200 is based on respective tenancies of the two services. A joint tenancy may include a service account, which can enable SSO for all of the users within a tenancy, and the service-account credentials can be securely stored, for example in a PKI-encryption-based database.

Figure 3:
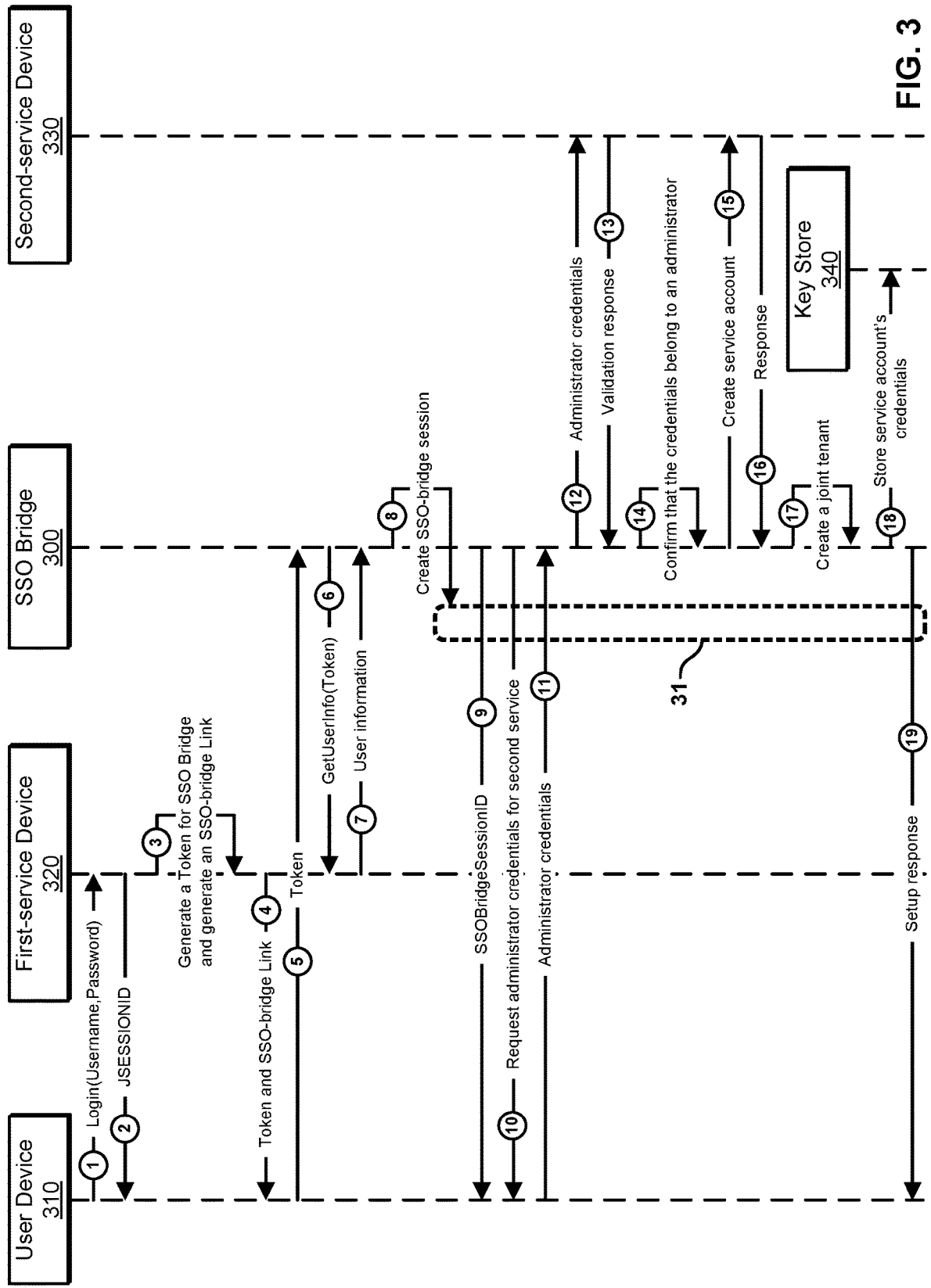
FIG. 3 illustrates an example embodiment of an operational flow for creating a joint tenant.

FIG. 3 illustrates an example embodiment of an operational flow for creating a joint tenant. Although this operational flow and the other operational flows that are described herein are each presented in a certain order, some embodiments of these operational flows may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks or stages, add blocks or stages, change the order of the blocks or stages, combine blocks or stages, or divide blocks or stages into more blocks or stages.

The flow starts in stage 1, where a user device 310 sends a login request to a first-service device 320. The login request includes credentials, which are a username and password in this example. In stage 2, the first-service device 320 returns a session identifier (a JSESSIONID in this embodiment) to the user device 310. In stage 3, the first-service device 320 generates a token for the SSO bridge 300 and generates an SSO-bridge link, and in stage 4 the first-service device 320 sends the token and the SSO-bridge link to the user device 310.

In stage 5, the user device 310 uses the SSO-bridge link to access the SSO bridge 300 and sends the token to the SSO bridge 300. In this embodiment, the user device uses SSO-BridgeHome, which is a portal's home page, to access the SSO bridge 300. Then in stage 6, the SSO bridge 300 sends the token and a request for user information to the first-service device 320 (e.g., using a GetUserinfo(token) call). In stage 7, after validating the token, the first-service device 320 sends user information to the SSO bridge 300. For example, the user information may describe the tenant that the user belongs to or other users in the tenant that the user belongs to.

Next, in stage 8, the SSO bridge 300 creates an SSO-bridge session 31, and in stage 9 the SSO bridge 300 sends an SSO-bridge-session identifier (e.g., SSOBridgeSessionID) to the user device 310. Also, in stage 10 the SSO bridge 300 sends a request for administrator credentials for the second service to the user device 310. In stage 11, the user device 310 replies with administrator credentials (e.g., a username and a password) for the second service. Then in stage 12, the SSO bridge 300 sends the administrator credentials for the second service to the second-service device 330. The second-service device 330 validates the administrator credentials and sends a validation response to the SSO bridge 300 in stage 13. The validation response indicates whether the credentials belong to an administrator.

In stage 14, the SSO bridge 300 confirms that the credentials for the second service belong to an administrator. Then, in stage 15, the SSO bridge 300 sends a request to create a service account in the second-service administrator's tenancy to the second-service device 330. The request can include credentials (e.g., a username and a password) for the service account. In stage 16, the second-service device 330 creates a service account and sends a response that indicates the successful creation of the service account to the SSO bridge 300. In some embodiments, the second-service device 330 generates the credentials for the service account and sends the credentials to the SSO bridge in stage 16. In stage 17, the SSO bridge 300 creates a joint tenant. The joint tenant includes at least one user of the tenant of the first service and includes the service account that was created in stage 16. Next, in stage 18, the SSO bridge 300 stores the service-account credentials in a key store 340. The key store 340 may store the service account's credentials in association with the joint tenant. Finally, in stage 19, the SSO bridge 300 sends a setup response to the user device 310. The setup response indicates whether the creation of the joint tenant was successful.

Figure 4:
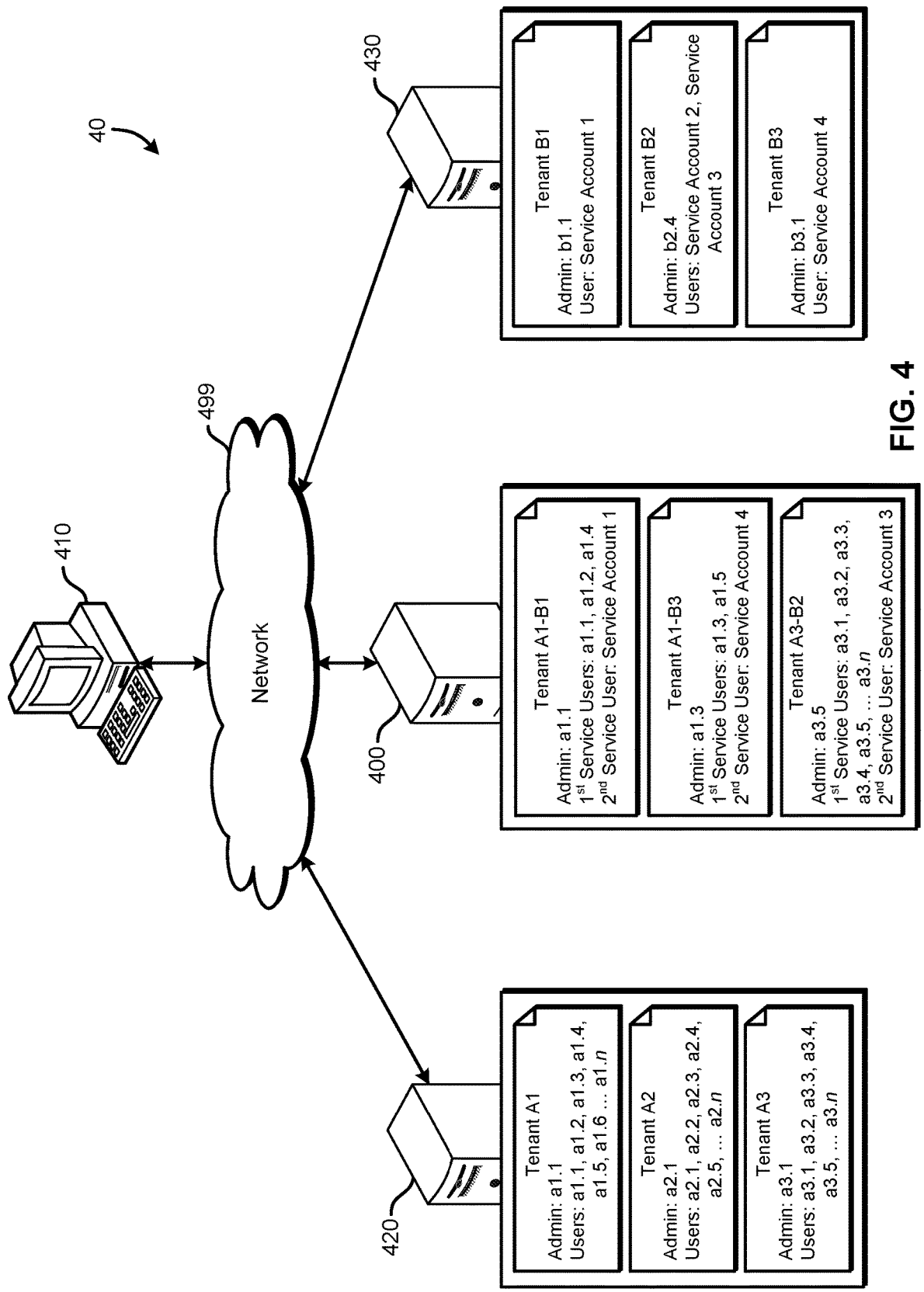

FIG. 4 illustrates an example embodiment of a system for zero-trust single sign-on. The system 40 includes a single-sign-on bridge device 400 (SSO bridge 400); a user device 410; a first-service device 420, which provides a first service (service A); and a second-service device 430, which provides a second service (service B). In this embodiment, a key store is implemented by the SSO bridge 400. Also, in this embodiment the devices communicate by means of a network 499.

The first-service device 420 has three tenants: tenant A1, tenant A2, and tenant A3. The second-service device 430 also has three tenants: tenant 131, tenant B2, and tenant B3. Additionally, the SSO bridge 400 has three joint tenants: tenant A1-B1, tenant A1-B3, and tenant A3-B2.

As shown by tenant A1-B1, a joint tenant may allow multiple user accounts of a single tenant of one service to use a single user account of another service (a many-to-one mapping). Thus, users a1.1, a1.2, and a1.4 of tenant A1 are all allowed to use service account 1 of tenant B1. Furthermore, more than one joint tenant may include user accounts from a single tenant. For example, tenant A1-B3 also includes users a1.3 and a1.5 from tenant A1. Moreover, a joint tenant may allow all of the users of a single tenant to use the same user account to access a tenant of another service. For example, joint tenant A3-B2 includes all of the user accounts of tenant A3, and joint tenant A3-B2 allows all of the user accounts of tenant A3 to use service account 3 to access tenant B2. Additionally, as shown by tenant B2, a tenant can also include more than one service account.

Therefore, when a joint tenancy is created, an administrator may have at least the following two options. The first option is to enable use of the joint tenancy by all user accounts of a tenancy of a service. In this option, all current and future users of the tenancy of the service will be automatically allowed to use the joint tenancy to access another service. The second option is to enable use of the joint tenancy by only selected users of a tenancy. In this option, only the selected users of the tenancy of the service will be able to use the joint tenancy to access another service.

Figure 5:
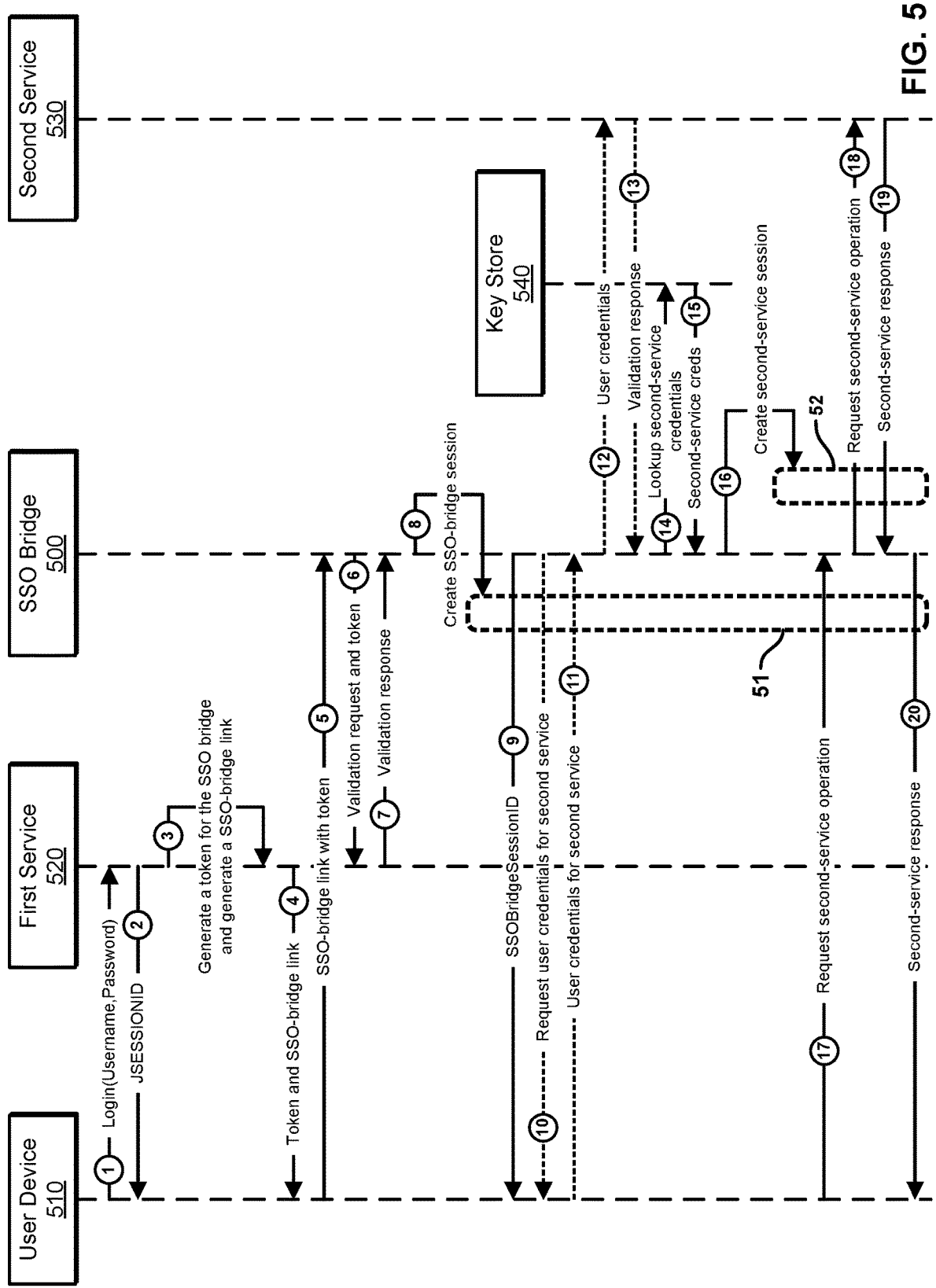
FIG. 5 illustrates an example embodiment of an operational flow for using a joint tenant to access a service.

FIG. 5 illustrates an example embodiment of an operational flow for using a joint tenant to access a service. The flow starts in stage 1, where a user device 510 sends a login request to a first-service device 520. In some embodiments, the login request specifically indicates that it is a request for a login to an SSO bridge. The login request includes credentials, which are a username and password in this example. In stage 2, the first-service device 520 returns a session identifier (a JSESSIONID in this embodiment) to the user device 510. In stage 3, the first-service device 520 generates a token for the SSO bridge 500 and generates an SSO-bridge link, and in stage 4 the first-service device 520 sends the token and the SSO-bridge link to the user device 510.

In stage 5, the user device 510 uses the SSO-bridge link to access the SSO bridge 500 and sends the token to the SSO bridge 500. Then in stage 6, the SSO bridge 500 sends the token and a validation request to the first-service device 520. In stage 7, the first-service device 520 sends a validation response to the SSO bridge 500. In some embodiments, in stage 6 the SSO bridge 500 also sends a request for user information, and in stage 7 the SSO bridge 500 also receives user information from the first-service device 520. The SSO-bridge uses the token (and user information in some embodiments) to identify a joint tenant that includes the user as a user of a service. Next, in stage 8, the SSO bridge 500 creates an SSO-bridge session 51, and in stage 9 the SSO bridge 500 sends an SSO-bridge-session identifier (e.g., SSOBridgeSessionID) to the user device 510.

This example embodiment also includes stages 10-13, although some embodiments omit these stages. For example, some embodiments allow an administrator to waive these stages when a joint tenant is created. Also, some embodiments perform stages 10-13 only when a user first uses a service account. In stage 10, the SSO bridge 500 sends a request for user credentials for the second service to the user device 510. In stage 11, the user device 510 replies with the user credentials for the second service. Then in stage 12, the SSO bridge 500 sends the user credentials to the second-service device 530. Next, in stage 13, the second-service device 530 validates the user credentials and sends a validation response to the SSO bridge 500. In some embodiments, the SSO bridge 500 adds a note to the joint tenant that indicates that the user is a verified user of the second service and is permitted to use the service account of the joint tenant to access the second service.

In stage 14, the SSO bridge 500 sends a request for credentials to the key store 540, which requests that the key store 540 return the second-service credentials of the joint tenant that the user is a member of. In some embodiments, the second-service credentials are the credentials of a service account of the second service, which is implemented by the second-service device 530. The key store 540 sends the second-service credentials to the SSO bridge 500 in stage 15. Then in stage 16, the SSO bridge 500 creates a second-service session 52 using the retrieved second-service credentials.

Next, in stage 17 the user device 510 sends a request for a second-service operation to the SSO bridge 500 via the SSO-bridge session 51. Then in stage 18, the SSO bridge 500 sends the request for the second-service operation to the second-service device 530 via the second-service session 52. In stage 19, the second-service device 530 performs the second-service operation and sends a second-service response to the SSO bridge 500 via the second-service session 52. Finally, in stage 20 the SSO bridge 500 sends the second-service response to the user device 510 via the SSO-bridge session 51.

In some embodiments, the user device 510 communicates directly with the second-service device 530 in stages 13-16. However, in the embodiment that is shown in FIG. 5, the second-service device is concealed from the user device 510.

Figure 6:
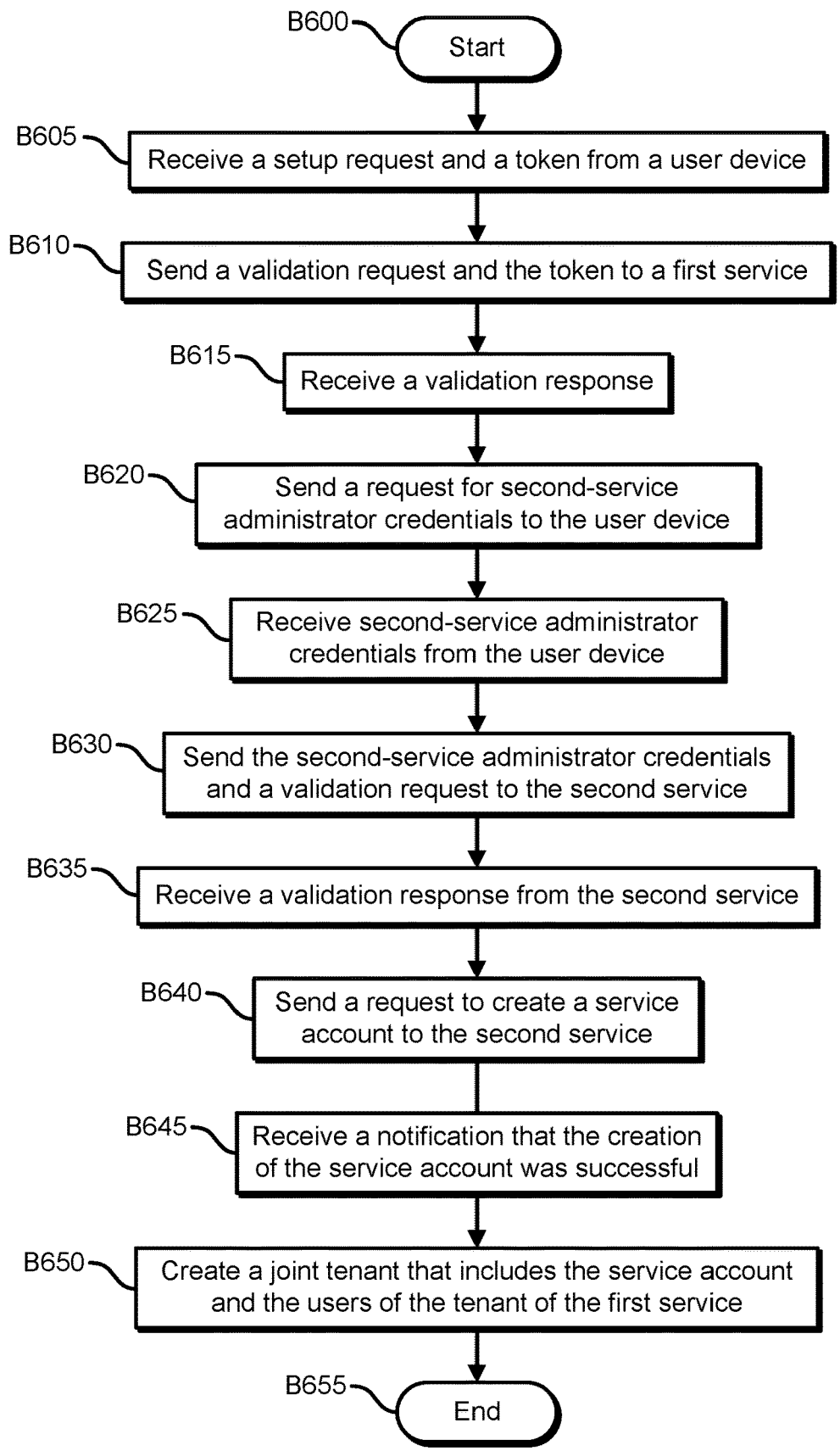
FIG. 6 illustrates an example embodiment of an operational flow for creating a joint tenant.
Figure 7:
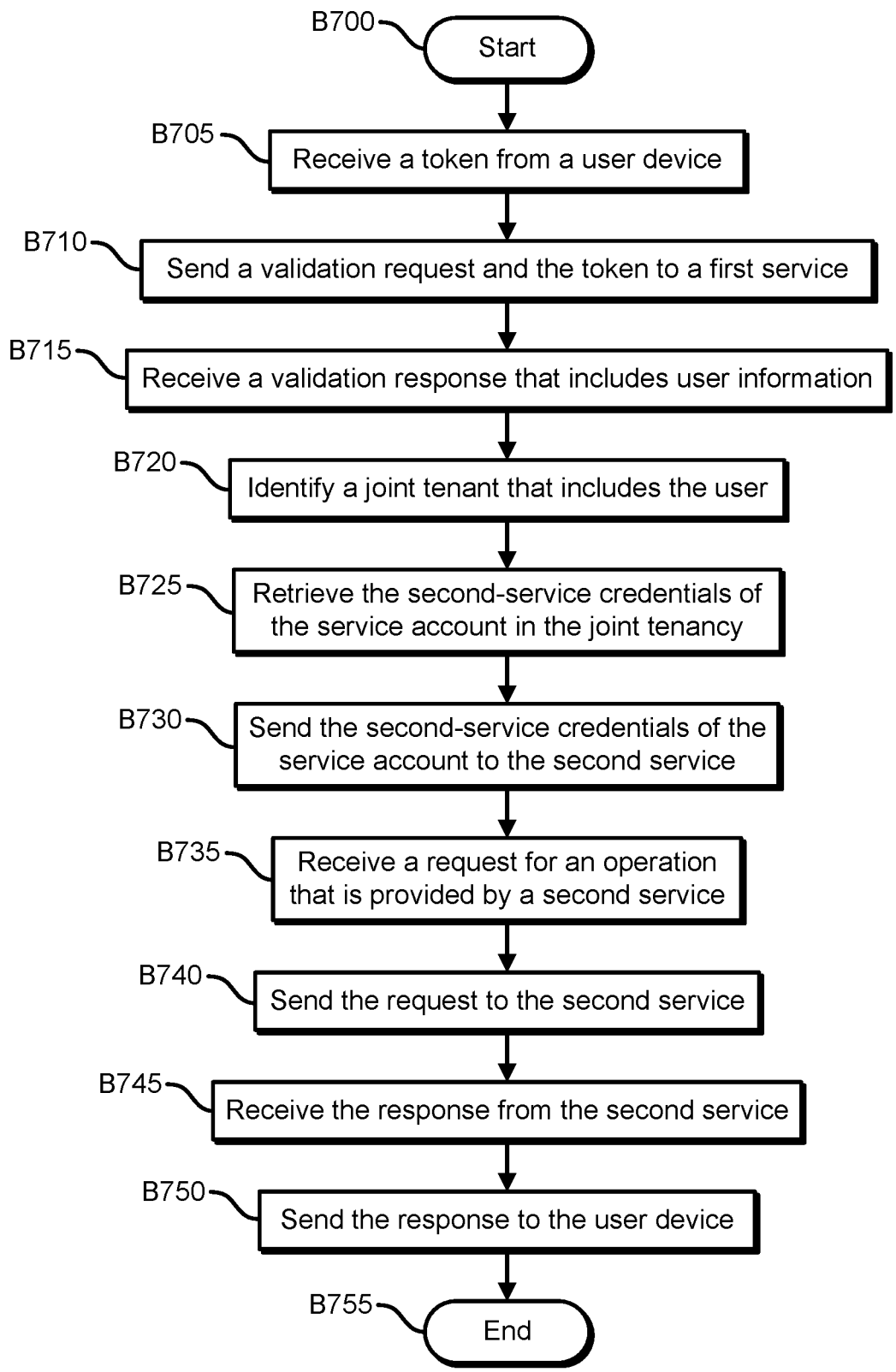
FIG. 7 illustrates an example embodiment of an operational flow for accessing a service.

FIG. 6 illustrates an example embodiment of an operational flow for creating a joint tenant. Furthermore, although this operational flow and the operational flow in FIG. 7 are performed by an SSO bridge, other embodiments of these operational flows may be performed by two or more SSO bridges or by one or more other specially-configured computing devices.

The flow starts in block B600 and then moves to block B605, where an SSO bridge receives a setup request and a token from a user device. Next, in block B610, the SSO bridge sends a validation request and the token to a first service, which is provided by a first-service device. The flow then moves to block B615, where the SSO bridge receives a validation response. In some embodiments, the validation response identifies a user, a first-service tenant of the user, and one or more other users in the first-service tenant.

Then, in block B620, the SSO bridge sends a request for administrator credentials for a second service (second-service administrator credentials) to the user device. Following, in block B625, the SSO bridge receives second-service administrator credentials from the user device. Next, in block B630, the SSO bridge sends the second-service administrator credentials to the second service, which is provided by a second-service device. The flow then moves to block B635, where the SSO bridge receives a validation response from the second service. Depending on the embodiment, the credentials or the validation response may identify a tenant of the second service. If the response indicates that the second-service administrator credentials are valid, then in block B640 the SSO bridge sends a request to create a service account to the second service. The request may indicate the tenant in which the service account should be created. In block B645, the SSO bridge receives a notification that the creation of the service account was successful. Also, either the SSO bridge generates second-service credentials of the service account in block B640, or the SSO bridge receives the second-service credentials of the service account from the second service in block B645. The SSO bridge stores the second-service credentials of the service account, for example in a key store. Next, in block B650, the SSO bridge creates a joint tenant. The joint tenant includes one or more users of the first service and the service account. Finally, the flow ends in block B655.

The following describes an example of the operational flow of FIG. 6 using the embodiment of the system that is illustrated in FIG. 4. In block B600, the SSO bridge 400 starts the operational flow, and then in block B605 the SSO bridge 400 receives a setup request and a token from the user device 410. The token was issued by the first-service device 420, and the token identifies a1.3 as the user, tenant A1 as the tenant of the user, and user a1.5 as another user of tenant A1.

Next, in block B610, the SSO bridge 400 sends the token and a validation request to the first-service device 420. The first-service device 420 validates the token and sends the validation response to the SSO bridge 400, which receives the validation response in block B615. Then in block B620, the SSO bridge 400 sends a request for second-service administrator credentials to the user device 410. The user device 410 sends the credentials of user b3.1 to the SSO bridge 400, which receives the credentials of user b3.1 in block B625.

The flow then moves to block B630, where the SSO bridge 400 sends a validation request and the administrator credentials of user b3.1 to the second-service device 430. The second-service device 430 validates the administrator credentials and sends a validation response to the SSO bridge 400, which receives the validation response in block B635. The validation response identifies tenant B3 as the tenant of user b3.1. Next, in block B640, the SSO bridge 400 uses the administrator credentials of user b3.1 to send a request to the second-service device 430. The request is a request to create a new service account, service account 4, in tenant B3. The SSO bridge 400 may generate the credentials (e.g., a username and a password) of service account 4 and send them in addition to the request. In block B645, the SSO bridge 400 receives a notification that the creation of service account 4 was successful from the second-service device 430. Also, the SSO bridge 400 may receive the credentials of service account 4 from the second-service device 430. In block B650, the SSO bridge creates a joint tenant, tenant A1-B3, and stores the credentials of service account 4 in a key store, which is part of the SSO bridge 400 in this example. Tenant A1-B3 allows users a1.3 and a1.5 in tenant A1 to use service account 4 in tenant B3.

FIG. 7 illustrates an example embodiment of an operational flow for accessing a service. The flow starts in block B700 and then moves to block B705, where an SSO bridge receives a token from a user device. The token may identify a user. Next, in block B710, the SSO bridge sends a validation request and the token to a first service, which is provided by a first-service device. The flow then moves to block B715, where the SSO bridge receives a validation response that includes user information. The user information identifies a user and a first-service tenant that includes the user. Then, in block B720, the SSO bridge identifies a joint tenant that includes the user.

The flow moves to block B725, where the SSO bridge retrieves the second-service credentials of the service account in the joint tenancy. The flow then proceeds to block B730, where the SSO bridge sends the second-service credentials of the service account to the second service. In some embodiments, the SSO bridges open a session with the second service using the second-service credentials in block B730. Next, in block B735, the SSO bridge receives a request for an operation that is provided by the second service. In some embodiments, the SSO bridge may receive this request before block B725. Then in block B740, the SSO bridge sends the request to the second service, for example through the session with the second service. The flow then moves to block B745, where the SSO bridge receives the response from the second service, and in block B750 the SSO bridge sends the response to the user device. Finally, the flow ends in block B755.

The following describes an example of the operational flow of FIG. 7 using the embodiment of the system that is illustrated in FIG. 4. In block B700, the SSO bridge 400 starts the operational flow, and in block B705 the SSO bridge 400 receives a token from the user device 410. The token was issued by the first-service device 420. In block B710, the SSO bridge 400 sends the token and a validation request to the first-service device 420. In block B715, the SSO bridge 400 receives the validation response and user information from the first-service device 420. The user information identifies user a3.3 and tenant A3.

Next, in block B720, the SSO bridge 400 identifies a joint tenant that includes user a3.3 as a tenant of A3, which is joint tenant A3-B2 in this example. The flow then moves to block B725, where the SSO bridge 400 retrieves the second-service credentials of the service account in tenant A3-B2, which is service account 3. The flow then proceeds to block B730, where the SSO bridge 400 sends the second-service credentials of service account 3 to the second-service device 430. The second-service credentials of service account 3 may be used to create a session between the SSO bridge 400 and the second-service device 430. In block B735, the SSO bridge 400 receives a request for an operation that is provided by the second service, and in block B740 the SSO bridge 400 sends the request to the second-service device 430, for example by means of the session. In block B745, the SSO bridge 400 receives the response from the second-service device 430. Finally, in block B750 the SSO bridge sends the response to the user device 410, and the SSO bridge 400 ends the flow in block B755.

Figure 8:
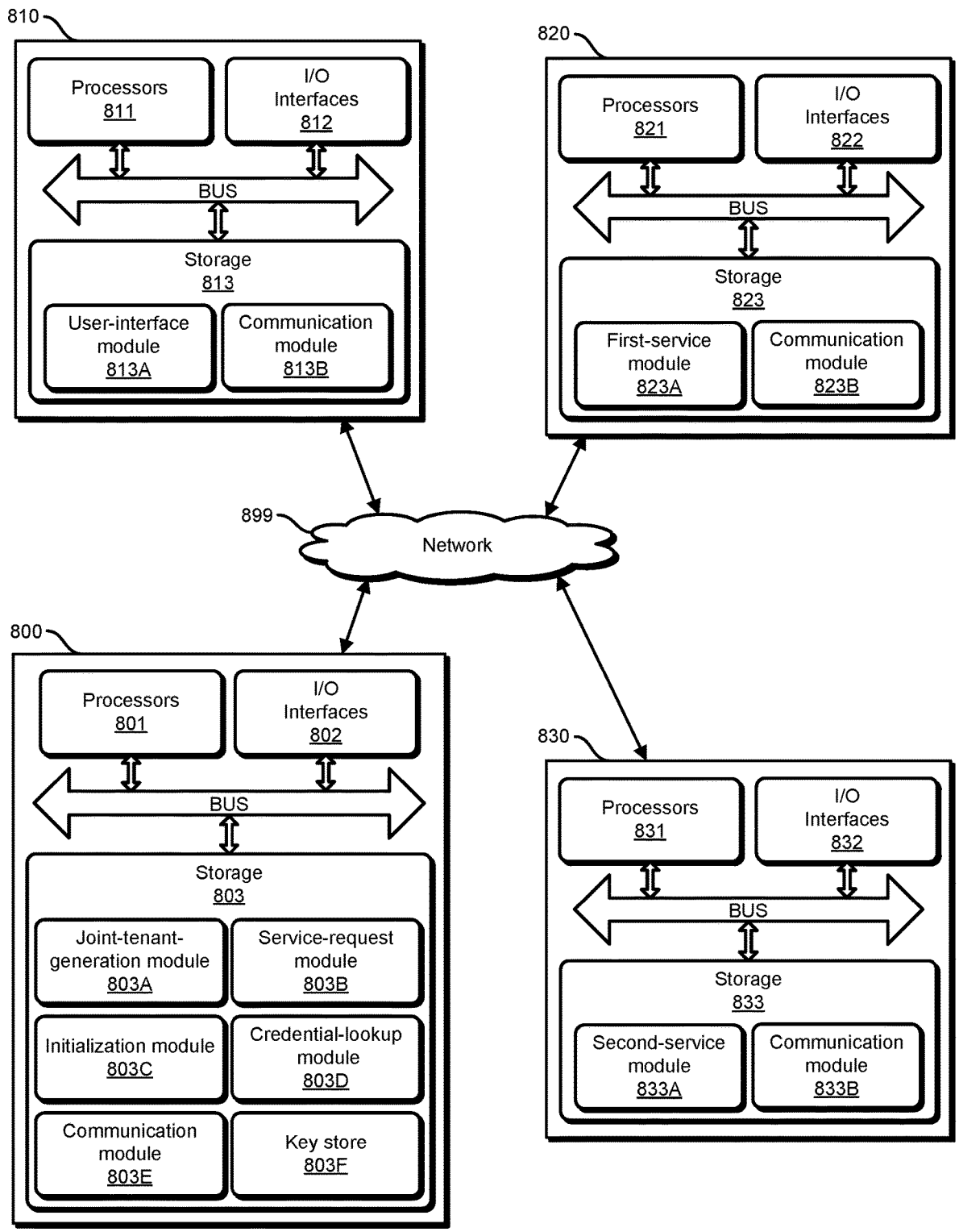

FIG. 8 illustrates an example embodiment of a system for zero-trust single sign-on. The system includes an SSO bridge 800, a user device 810, a first-service device 820, and a second-service device 830. In this embodiment, the devices communicate by means of one or more networks 899, which may include a wired network, a wireless network, a LAN, a WAN, a MAN, and a PAN. Also, in some embodiments the devices communicate by means of other wired or wireless channels.

The SSO bridge 800 includes one or more processors 801, one or more I/O interfaces 802, and storage 803. Also, the hardware components of the SSO bridge 800 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 801 include one or more central processing units (CPUs), which include microprocessors (e.g., a single core microprocessor, a multi-core microprocessor); one or more graphics processing units (GPUs); one or more application-specific integrated circuits (ASICs); one or more digital signal processors (DSPs); or other electronic circuitry (e.g., other integrated circuits). The one or more processors 801 are configured to read and perform computer-executable operations, such as operations that are defined by instructions that are stored in the storage 803, or to perform computer-executable operations that are designed into the logic of the processors 801. The I/O interfaces 802 include communication interfaces to input and output devices, which may include a keyboard, a display, a mouse, a printing device, a touch screen, a light pen, an optical-storage device, a scanner, a microphone, a camera, a drive, a hand-held controller (e.g., a joystick, a control pad, a remote control), and a network interface controller.

The storage 803 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 803, which may include both ROM and RAM, can store computer-readable data or computer-executable instructions.

The SSO bridge 800 also includes a joint-tenant-generation module 803A, a service-request module 803B, an initialization module 803C, a credential lookup-module 803D, and a communication module 803E. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software (e.g., the embodiment in FIG. 8), the software can be stored in the storage 803. In this embodiment, the SSO bridge 800 also includes a key store 803F.

The joint-tenant-generation module 803A includes instructions that, when executed, or circuits that, when activated, cause the SSO bridge 800 to request the creation of a new service account or to generate a joint tenant, for example as described in stages 10-11 in FIG. 2, in stages 15-17 in FIG. 3, or in blocks B640-B650 in FIG. 6. The joint-tenant-generation module 803A may cause the SSO bridge 800 to store the credentials of a service account in the key store 803F, and the joint-tenant-generation module 803A may call the communication module 803E.

The service-request module 803B includes instructions that, when executed, or circuits that, when activated, cause the SSO bridge 800 to receive requests to perform an operation that is provided by a service, send the request and service account credentials to a service device (e.g., the first-service device 820, the second-service device 830), receive a reply from the service device, or send the reply to the user device 800, for example as described in stages 12-16 in FIG. 5 or in blocks B720-B750 in FIG. 7. The service-request module 803B may call the credential-lookup module 803D or the communication module 803E.

The initialization module 803C includes instructions that, when executed, or circuits that, when activated, cause the SSO bridge 800 to receive a token from the user device 800, send a validation request to a service device (e.g., the first-service device 820, the second-service device 830), receive the validation response from the service device, create an SSO-bridge session, or send an SSO-bridge-session identifier to the user device 800, for example as described in stages 3-5 in FIG. 2, in stages 5-9 in FIG. 3, in stages 5-9 in FIG. 5, in blocks B605-B615 in FIG. 6, or in blocks B705-715 in FIG. 7. And the initialization module 803C may call the communication module 803E.

The credential-lookup module 803D includes instructions that, when executed, or circuits that, when activated, cause the SSO bridge 800 to lookup stored service-account credentials in the key store 803F, for example as described in stages 10-11 in FIG. 5 or in block B725 in FIG. 6.

The communication module 803E includes instructions that, when executed, or circuits that, when activated, cause the SSO bridge 800 to communicate with one or more other devices, for example the user device 810, the first-service device 820, and the second-service device 830.

The user device 810 includes one or more processors 811, one or more I/O interfaces 812, and storage 813, and the hardware components of the user device 810 communicate by means of a bus. The user device 810 also includes a user-interface module 813A and a communication module 813B. The user-interface module 813A includes instructions that, when executed, or circuits that, when activated, cause the user device 810 to interface with a user to receive data (e.g., credentials, a request for a service, a request to create a joint tenant) by means of one or more input devices. And the communication module 813B includes instructions that, when executed, or circuits that, when activated, cause the user device 810 to communicate with other devices (e.g., the SSO bridge 800), for example as described in stages 1-3, 6, and 7 in FIG. 2; in stages 1, 2, 4, 5, 9-11, and 19 in FIG. 3; in stages 1, 2, 4, 5, 9, 13, and 16 in FIG. 5; in blocks B605, B620, and B625 in FIG. 6; or in blocks B705, B735, and B750 in FIG. 7.

The first-service device 820 includes one or more processors 821, one or more I/O interfaces 822, and storage 823, and the hardware components of the first-service device 820 communicate by means of a bus. The first-service device 820 also includes a first-service module 823A and a communication module 823B. The first-service module 823A includes instructions that, when executed, or circuits that, when activated, cause the first-service device 820 to perform operations that implement a first service. And the communication module 823B includes instructions that, when executed, or circuits that, when activated, cause the first-service device 820 to communicate with other devices (e.g. the SSO bridge 800), for example as described in stages 1, 2, 4, and 5 in FIG. 2; in stages 1, 2, 4, 6, and 7 in FIG. 3; in stages 1, 2, 4, 6, and 7 in FIG. 5; in blocks B610 and B615 in FIG. 6; or in blocks B710 and B715 in FIG. 7.

The second-service device 830 includes one or more processors 831, one or more I/O interfaces 832, and storage 833, and the hardware components of the second-service device 830 communicate by means of a bus. The second-service device 830 also includes a second-service module 833A and a communication module 833B. The second-service module 833A includes instructions that, when executed, or circuits that, when activated, cause the second-service device 830 to perform operations that implement a second service. And the communication module 833B includes instructions that, when executed, or circuits that, when activated, cause the second-service device 830 to communicate with other devices (e.g. the SSO bridge 800), for example as described in stages 8-10 in FIG. 2; in stages 12, 13, 15, and 16 in FIG. 3; in stages 14 and 15 in FIG. 5; in blocks B630-B645 in FIG. 6; or in blocks B730 and B740-6745 in FIG. 7.

Some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and other arrangements. Also, as used herein, the conjunction "or" generally refers to an inclusive "or," although "or" may refer to an exclusive "or" if expressly indicated or if the context indicates that the "or" is an exclusive "or."

What is claimed is:

1. A device comprising:
   one or more computer-readable storage media; and
   one or more processors that are coupled to the one or more computer-readable storage media and that are configured to cause the device to
   receive a request to create a joint tenant;
   receive information that includes an identifier of a first service, a tenant identifier of a tenant of the first service, and an identifier of a first user of the tenant of the first service;
   receive one or more administrator credentials for a second service;
   send, to the second service, the one or more administrator credentials and
   a request to create a service account of a tenant of the second service; and
   create a joint tenant that includes the tenant identifier of the tenant of the first service, respective identifiers of a plurality of users of the tenant of the first service, wherein the plurality of users of the tenant of the first service include the first user of the tenant of the first service, and an identifier of the service account of the tenant of the second service, wherein the joint tenant associates the plurality of users of the tenant of the first service with the service account of the tenant of the second service.

2. The device of claim 1, wherein the one or more processors are further configured to cause the device to
   obtain one or more credentials for the service account; and
   store the one or more credentials for the service account.

3. The device of claim 2, wherein the one or more processors are further configured to cause the device to not send the one or more credentials for the service account to a user device.

4. The device of claim 1, wherein the one or more processors are further configured to cause the device to
   send a token and a validation request to the first service; and
   receive a validation response from the first service.

5. The device of claim 1, wherein the one or more processors are further configured to cause the device to:
   receive an instruction for a requested operation that includes an identifier of a user of the plurality of users of the tenant of the first service;
   determine whether the requested operation is provided by the first service or the second service;
   in a case where the requested operation is provided by the first service,
      retrieve credentials of the user that are associated with the tenant identifier of the tenant of the first service, and
      send the instruction and the credentials of the user that are associated with the tenant identifier of the tenant of the first service to the first service; and
   in a case where the requested operation is provided by the second service,
      retrieve credentials of the service account of the tenant of the second service, and
      send the instruction and the credentials of the service account to the second service.

6. The device of claim 1, wherein the one or more processors are further configured to cause the device to
   receive a token for a requesting user;
   identify a joint tenant that is associated with the requesting user;
   retrieve one or more second-service credentials of a service account in a tenant of the second service that is included in the joint tenant that is associated with the requesting user; and
   send the one or more second-service credentials to the second service.

7. The device of claim 6, wherein the requesting user is a user of a tenant of the first service that is included in the joint tenant that is associated with the requesting user.

8. A method comprising:
receiving a token and a request to create a joint tenant;
receiving user information that includes an identifier of a first service, a tenant identifier of a tenant of the first service, and an identifier of a first user of the tenant of the first service;
receiving one or more administrator credentials for a second service that is implemented by one or more second-service devices;
sending, to the one or more second-service devices, the one or more administrator credentials and a request to create a service account of a tenant of the second service; and
creating a joint tenant that includes the tenant identifier of the tenant of the first service, respective identifiers of a plurality of users of the tenant of the first service, and an identifier of the service account of the tenant of the second service, wherein the plurality of users of the tenant of the first service include the first user of the tenant of the first service, and wherein the joint tenant maps the plurality of users of the tenant of the first service to the service account of the tenant of the second service.

9. The method of claim 8, further comprising:
sending the token and a validation request to one or more first-service devices; and
receiving a validation response and the user information from the one or more first-service devices, wherein the user information and the validation response are sent in response to the sending of the token and the validation request.

10. The method of claim 8, further comprising:
generating credentials for the service account;
sending the credentials for the service account to the one or more second-service devices; and
storing the credentials for the service account.

11. The method of claim 8, further comprising:
receiving credentials for the service account from the one or more second-service devices; and
storing the credentials for the service account.

12. The method of claim 8, further comprising:
receiving an instruction for a requested operation that includes an identifier of a user of the plurality of users of the tenant of the first service;
determining whether the requested operation is provided by one or more first-service devices or the one or more second-service devices;
in a case where the requested operation is provided by the one or more first-service devices,
retrieving credentials of the user of the plurality of users of the tenant of the first service, and
sending the instruction and the credentials of the user of the plurality of users of the tenant of the first service to the one or more first-service devices; and
in a case where the requested operation is provided by the one or more second-service devices,
retrieving credentials of the service account of the tenant of the second service, and
sending the instruction and the credentials of the service account of the tenant of the second service to the one or more second-service devices.

13. One or more computer-readable storage media storing instructions that, when executed by one or more computing devices, cause the one or more computing devices to perform operations comprising:
receiving a request to create a joint tenant;
receiving information that includes an identifier of a first service that is provided by one or more first-service devices, an identifier of a tenant of the first service, and an identifier of a first user of the tenant of the first service;
receiving one or more administrator credentials for a second service that is provided by one or more second-service devices;
sending, to the one or more second-service devices, the one or more administrator credentials and a request to create a service account of a tenant of the second service; and
creating a joint tenant that includes the tenant identifier of the tenant of the first service, respective identifiers of a plurality of users of the tenant of the first service, wherein the plurality of users include the first user, and an identifier of the service account of the tenant of the second service, wherein the joint tenant associates the plurality of users of the tenant of the first service with the service account of the tenant of the second service.

14. The one or more computer-readable storage media of claim 13, wherein the operations further comprise:
receiving a request for an operation, wherein the request includes the identifier of the first user;
identifying the joint tenant that includes the identifier of the first user; and
in response to identifying the joint tenant that includes the identifier of the first user,
obtaining credentials of the service account of the joint tenant, and
sending the credentials and the request for the operation to the one or more second-service devices.

15. The one or more computer-readable storage media of claim 13,
wherein the first service and the second service do not have a relationship of trust.

16. The one or more computer-readable media of claim 13, wherein the operations further comprise discarding the one or more administrator credentials after creating the joint tenant.

17. The one or more computer-readable storage media of claim 13, wherein the operations further comprise:
obtaining one or more credentials for the service account; and
storing the one or more credentials for the service account.

18. The one or more computer-readable storage media of claim 13, wherein the operations further comprise:
receiving a token for a requesting user;
identifying a joint tenant that is associated with the requesting user;
retrieving one or more second-service credentials of the service account that is included in the joint tenant; and
sending the one or more second-service credentials to the one or more second-service devices.

19. The one or more computer-readable storage media of claim 18, wherein the operations further comprise:
sending a request for the second service to perform one or more operations to the one or more second-service devices.

20. The one or more computer-readable storage media of claim 18, wherein the operations further comprise:

receiving second-service credentials for the requesting user;

sending the second-service credentials for the requesting user to the one or more second-service devices;

receiving a validation response from the one or more second-service devices that indicates that the second-service credentials for the requesting user are valid; and modifying the joint tenant to indicate that the requesting user has verified permission to use the service account of the tenant of the second service.

\* \* \* \* \*